Nov. 13, 1945. H. H. BROOKSIEKER ET AL 2,388,900

TEXTILE MILL SPINDLE

Filed June 21, 1944

INVENTORS
HERMAN H. BROOKSIEKER
PAUL I. THYREEN
By George M Soule
ATTORNEY

Patented Nov. 13, 1945

2,388,900

UNITED STATES PATENT OFFICE 2,388,900

TEXTILE MILL SPINDLE

Herman H. Brooksieker, Cleveland Heights, and Paul I. Thyreen, Euclid, Ohio, assignors to The Marquette Metal Products Company, Cleveland, Ohio, a corporation of Ohio Application June 21, 1944, Serial No. 541,420

6 Claims. (Cl. 57—88)

This invention relates to a spindle such as used in textile mills, as for spinning or twisting.

Textile mill spindles have been very highly developed and recent improvements in anti-friction bolster bearing construction and resiliently mounted footstep bearings have permitted increases in loading, speed of operation, and life of the unit. However, improvements in brake design have not kept pace with the increased speeds which demand greater braking forces. Furthermore, the bolster case and associated fixed supporting elements as usually constructed require excessive machining and forming operations and are therefore relatively costly.

In accordance with this invention an improved spindle is provided which has all of the advantages of present spindles, particularly those possessed by the spindle described in United States Patent No. 2,351,951, issued June 20, 1944, but which incorporates a greatly simplified bolster case, improved bearing construction, and an improved brake mechanism capable of exerting adequate and uniform braking force without eccentric loading of the spindle bearings and without excessive wear. The novel construction disclosed herein permits the use of standard tubing for the bolster case thereby reducing to a minimum the required machining. Instead of an integral flange being provided for supporting the bolster case on the spindle rail, a collar serving as such a flange and also constituting a support for the brake operating mechanism is secured very rigidly to the case by a simple brazing operation. The support upon which the footstep bearing rests is so constructed that it may be brazed into position to form an oil tight seal at the bottom of the bolster case, special provision being made for preventing the brazing alloy to come into contact with and thereby possibly block or restrain the desired laterally floating movement of the footstep bearing.

The improvement in brakes for textile mill spindles presented herewith relates to means whereby strong braking forces can be quickly and positively applied to the spindle shaft assembly uniformly around substantially its entire periphery, as at the inner cylindrical surface of the whorl, such that no effective transverse forces are applied to the spindle shaft during braking and such that the wear on the brake shoes is uniformly distributed. The improved operating mechanism for the brake is simple to manufacture and assemble, and permits brake actuation to be under the ready control of the operator at all times.

The general object of this invention is to provide a textile mill spindle having the foregoing advantages and features.

Another object is to simplify the construction of the bolster case.

Still another object is to provide an improved braking mechanism for textile mill spindles in which the braking force is uniformly distributed over the entire brake shoe area.

Further objects include the provision of a novel and easily constructed and assembled bolster bearing assembly, a construction permitting the use of standard tubing for the bolster case, and an improved support for the footstep bearing.

Other objects and advantages will become apparent from the following specification wherein reference is made to the drawing, in which.

Figure 1:
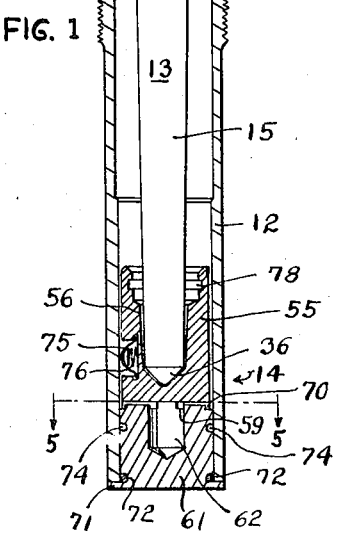
Fig. 1 is a longitudinal central sectional assembly view of a spindle embodying the principles of the invention in one form.

In Fig. 1, a bolster case 10, preferably formed of standard seamless metal tubing, has an upper portion 11 containing a bolster bearing assembly and a lower portion 12 containing a footstep bearing 14 and lower end portion 13 of a spindle shaft or blade 15. The tapered, bobbin-supporting or free end portion 16 of the blade projects upwardly from a driving whorl 18 which forms part of the blade by reason of having a hub 19 fixed as by press fitting to the shaft at 20. The lower part 21 of the whorl surrounds the portion 11 of the bolster case (free therefrom), and may have a substantially cylindrical but somewhat barrel shaped surface 22 for engaging a driving belt or band (not shown). Below the surface 22, the whorl has an enlarged rim or flange portion 24, the inner cylindrical face of which constitutes an internal braking surface 25 complementary to brake shoe members to be described later.

The lower part of the portion 11 of the bolster case 10 fits within an eccentric opening 26 in a circular flange or collar 28 which forms part of the bolster case and functions as a supporting means for both the case and the brake mechanism. As shown, the collar 28 is clamped against the top side of the usual fixed spindle rail as by a suitable nut, not shown, fitting threads 30 of the portion 12 of the bolster case. A brazed joint between the collar and case is provided by inserting a wire or strip of suitable brazing alloy (e. g., "silver solder") in an annular groove 32 formed in the peripheral surface of the case, sliding or pressing the flange 28 into position, heating the assembly as by immersion in a fused salt bath to melt the brazing alloy and thereby cause it to flow throughout the space between the flange and case, and then cooling. By means of this construction the necessity of making the bolster case of screw machine stock and turning an integral flange thereon is obviated yet the flange becomes in operative effect an integral part of the bolster case.

The spindle blade 15 has a cylindrical portion 34 extending for some distance downwardly from the hub 19 for supporting engagement with a bolster bearing, and the tapered portion 13 extends downwardly from the cylindrical portion to the footstep bearing 14 where the blade has a conical portion 36 within the footstep. The cylindrical portion 34 preferably serves as the inner race surface in respect to a set of rollers 38 contained in a bolster assembly 39 and preferably bearing directly on the inner polished cylindrical surface of a tubular member 40 thereof.

Figure 2:
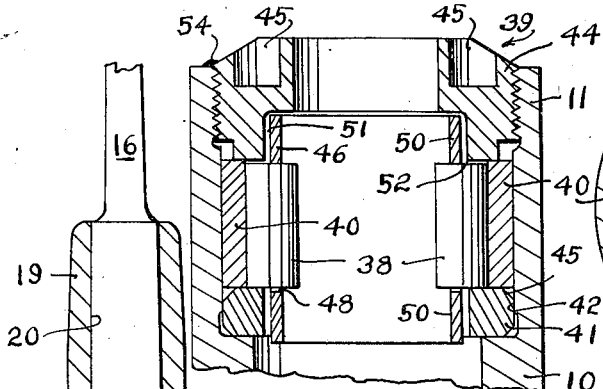
Fig. 2 is a relatively enlarged sectional detail view of the bolster and the bolster bearing portion of the spindle.
Figure 3:
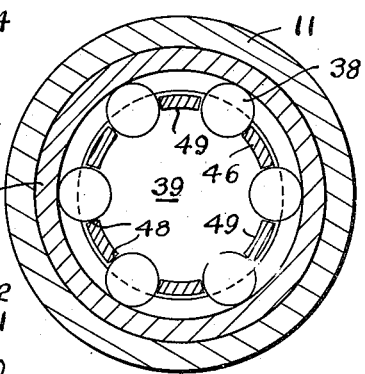
Fig. 3 is a cross sectional view taken at 3—3 of Fig. 1.

Referring especially to Fig. 2, the tubular member 40 is clamped between a ring or collar 41 resting on an annular shoulder defined by a counterbore 42 of the bolster case 10 and a retainer nut 44 having spanner openings 45 and threaded into the upper end of the counterbore.

The lower ends of the rollers 38 are supported on the smooth upper surface of the ring 41 which may have an upper chamfered surface 45. A roller retaining and spacing cage 46 occupies the space horizontally between the race forming inner wall surface of the bolster and the race portion of the spindle blade and which is unoccupied by the rollers. The cage 46 has vertical parallel slots 48 loosely receiving the rollers and intercepting the planes of its inner and outer peripheral surfaces. The cage can be a brass or bronze ring of well known form which is separated into spaced fingers 49 by the slots 48 which extend between upper and lower intact portions 50 of the ring. The inner and outer peripheral surfaces of the cage 46 are spaced from the bearing races, this spacing being accomplished by the rollers at the parallel slots of the cage. Any other suitable roller retainer and spacer could be used instead of the one shown.

The external diameter of the bearing sleeve member 40 is, for example, .001" larger than the diameter of the counterbore 42 of the bolster case, so that the sleeve can be held rigidly in place primarily by a press fit. There are, of course, other ways than that shown by which to secure the sleeve 40 fixedly in the bolster case, for instance, by welding. The retainer nut 44 loosely surrounds the spindle blade and has a counterbore 51 which loosely receives the upper portion 50 of the roller retainer. The outer marginal area of the annular lower face 52 of the retainer nut bears against the member 40 and the inner marginal area thereof limits upward travel of the rollers to a very slight movement. Adequate clearance is provided between the retainer portions 50 and the ring 41 and the nut 44 as well as between the retainer cage and the bearing race surfaces so that the cage can turn freely. After the nut 44 has been seated, a tack weld or series of welds 54 can be made as shown to lock the nut.

Irrespective of the type of footstep bearing which is used, the amount of radial travel of it in any one direction is preferably limited to a distance approximately the same as or slightly greater than the total radial clearance tolerance between the bearing elements in a corresponding direction. This relationship prevents wear on the rollers and races in the event the footstep gyrates to its fullest possible extent during turning of the spindle while carrying an unbalanced load. Lateral movement of the footstep cannot cause the rollers to become wedged; yet the rollers are never loose, i. e. out of effective rolling contact with the inner and outer race surfaces through the lubricating oil film.

Figure 5:
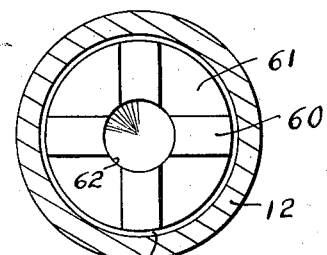
Fig. 5 is a cross sectional view taken at 5—5 of Fig. 1.

Referring to the footstep bearing 14 shown in Figs. 1 and 5, the body 55 thereof is appropriately bored and polished at 56 and 58 to receive the tapered portion 13 and conical lower end portion 36 of the spindle blade, the blade and tapered hole being in close running fit at the lower part of said blade portion. To hold the body 55 of the footstep bearing against turning, the lower face of it is provided with a plurality of radial projections 59 loosely received in complementary cross slots 60 formed in the upper face of a closure plug 61. The plug has an axial hole 62 in its upper face into the outer marginal area of which the projections 59 extend and is also provided with an annular shouldered portion 70 at the outer marginal area.

A flange 71 is provided at the lower end of the plug 61 and overlies the lower end face of the bolster case. An annular groove 72 in the peripheral surface of the plug contiguous with the flange receives prior to assembly a strip of suitable brazing alloy such as silver solder. After the plug is properly positioned the assembly is heated to fuse the alloy which flows between the bolster case and plug where it subsequently hardens to hold the plug rigidly in position and prevent oil leakage. An annular groove 74 is provided near the top of the plug 61 and effectively prevents the alloy from flowing to the grooves 60 where it would tend to freeze the projections 59 and prevent lateral movement of the body 55.

A centering means is arranged yieldably to constrain the body 55 toward centered position in the bolster case by forces which progressively increase in proportion to the distance the body becomes displaced eccentrically of the bore of the bolster case occupied by it thereby to oppose gyration and vibration of the lower end of the spindle blade. A simple and effective means for accomplishing this is the provision of a plurality of radially guided buttons 75 biased outwardly by short coil springs 76 which are carefully calibrated to secure equal deflection or "weight" on all the buttons. Three equally spaced spring buttons can be used approximately in the plane of the center of lateral pressure of the blade on the body, or two rows of equally spaced buttons in planes above and below such center can be used. The buttons have outwardly turned flanges received in grooves in side walls of the guiding sockets to prevent them from becoming detached from the footstep by the spring force. Groove 78 is for engagement with an expansible and contractible extraction and inserting tool for the footstep bearing.

For lubrication, a sufficient volume of oil is preferably introduced into the bolster case as through an oil gland or nipple on the flange 28 so that the slightly tapered portion 13 of the blade above the footstep bearing is maintained immersed. As the oil level recedes, enough oil for lubrication of the bolster bearing climbs said slightly tapered blade portion.

Figure 4:
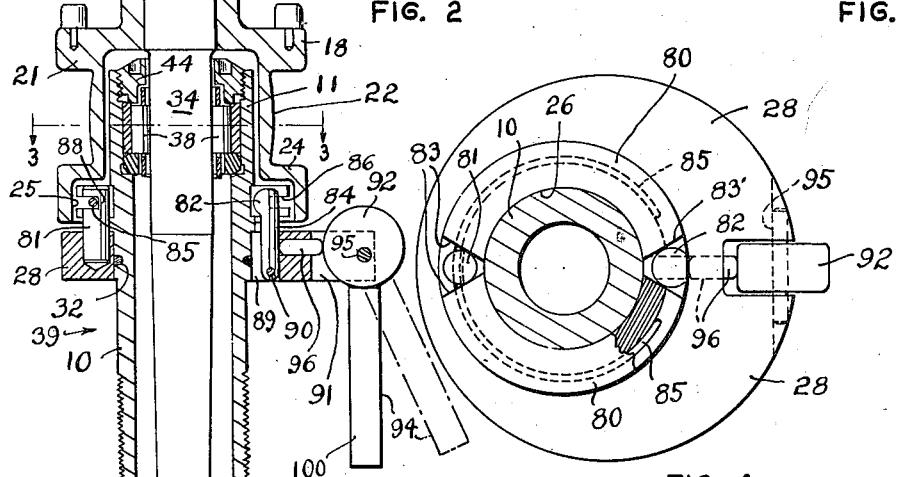
Fig. 4 is a transverse, partly sectional, relatively enlarged view of the brake and the brake operating mechanism.

Referring to the brake, Figs. 1 and 4, this, as shown, comprises two identical arcuate shoe members 80 slidably received for vertical support in a shallow groove in the bolster case opposite the flange portion 24 of the whorl 18. One pair of spaced, non-radial end faces 83 of the shoes 80 are slidably disposed on opposite sides of a fixed cylindrical pin 81, and the other similar pair 83' of end faces are likewise disposed on opposite sides of a "ball" head portion 82 of a generally cylindrical lever 84. The shoes 80 are formed of substantially rigid friction material and are normally pressed inwardly in non-braking position by a C-shaped spring wire ring 85 which lies in a groove 86 formed in the outer peripheral surface of the shoes and extending nearly around the entire periphery of the two shoes. The pin 81 is cut away as at 88 to provide clearance for the spring. The pin 81 is secured as by a press fit in a complementary socket in the flange or collar 28 and the lever 84 has its lower cylindrical portion loosely received in an axial opening 89 in the flange and is pivoted near its lowermost end on a cross pin 90 intersecting the opening 89.

The flange 28 is provided with a slot 91 at its marginal area farthest from the opening 26 within which slot a cylindrical cam head portion 92 of a manual operating lever 94 is received, the lever 94 being pivoted on a cross pin 95 passing eccentrically through said head portion. Upon movement of the lower arm portion 100 of the lever 94 from the solid line position to the broken line position (Fig. 1), the head portion 92 forces a pin 96, slidably received in a radial opening extending from the slot 91 to the axial opening 89, inwardly against the lever 84 to move the "ball" head 82 inwardly. Inward movement of the head 82 forces the ends of the shoes 80 adjacent the end faces 83' outwardly against the braking surface 25, and, concurrently, the opposite ends of the shoes 80 are forced against the surface 25 with equal force as the end faces 83 slide on the pin 81. The braking force is equalized thereby throughout the entire peripheral area of the shoes so that the braking force is a maximum for unit of force on the lever 94 and wear on the shoes is uniformly distributed.

The nature of the cam 92 is such that when the handle 100 is moved to braking position it has to be returned by hand to brake releasing position. The actuator for the brake could of course be modified so that the part which the attendant or operator moves to apply the brake will automatically return to brake-releasing position after the operating pressure on said part is removed. The C-shaped spring 85 has much more than adequate force to return the brake shoes 80 to releasing position and to effect concomitant return movement of the lever 84 and pin 96.

We claim:

1. In a spindle of the class described, a bolster case member, a blade member journaled in said case, an internal brake surface on one of the members, a cooperating pair of brake shoes supported on the other member, each shoe having non-radial camming surfaces at opposite ends, an actuator cam mounted to engage and force apart relatively adjacent non-radial surfaces of the two shoes to effect braking, and a fixed cam member operatively associated with the other two non-radial surfaces and rendered active to force the adjacent end portions of the shoes into braking contact with said internal brake surface as a consequence of movement of the opposite ends of the shoes by the actuator cam.

2. A spindle comprising a bolster case, a blade rotatably supported centrally of the case, a whorl portion of the blade having an inner brake surface, a pair of arcuate brake shoe elements provided with external circular arc braking surfaces and partially surrounding the blade adjacent the whorl, adjacent end faces of said shoe elements converging inwardly from said braking surfaces, guiding means for the shoe elements whereby they can move outwardly toward and inwardly away from said brake surface, brake actuating means disposed between and in slidable contact with pairs of adjacent end faces, respectively, means for moving one of said actuating means inwardly to move said shoe elements toward said brake surface, movement of said shoe elements outwardly being accompanied by sliding action between said other actuating means and its associated end faces of the shoe elements, whereby said shoe elements move substantially radially away from said blade.

3. A spindle comprising a bolster case, a blade rotatably supported centrally of the case, a whorl portion of the blade having an inner brake surface, a pair of arcuate brake shoe elements provided with external circular arc braking surfaces and partially surrounding the blade adjacent the whorl, adjacent end faces of said shoe elements converging inwardly from said braking surfaces, guiding means for the shoe elements whereby they can move outwardly toward and inwardly away from said brake surface, a rigid pin disposed between and in sliding contact with one pair of said converging end faces, a movable pin disposed between said other pair of converging end faces, means for moving said movable pin toward said blade to force its associated pair of converging end faces apart to move thereby said shoe members outwardly against said braking surface of the whorl, said movement of said movable pin being accompanied by sliding action between said rigid pin and its associated converging end faces, whereby said shoe elements move outwardly substantially radially.

4. A spindle comprising a bolster case, a blade rotatably supported centrally of the case, a whorl portion of the blade having an inner brake surface, a pair of arcuate brake shoe elements provided with external circular arc braking surfaces and partially surrounding the blade adjacent the whorl, adjacent end faces of said shoe elements converging inwardly from said braking surfaces, guiding means for the shoe elements whereby they can move outwardly toward and inwardly away from said brake surface, external peripherally open circumferential grooves in the shoes lying inwardly from said braking surfaces thereof and a spring wire member of C-shape positioned in embracing relation to both shoes and occupying the grooves and located radially inwardly a substantial distance from the braking surfaces of the shoes, a rigid pin disposed between one pair of said converging end faces and cut away to provide clearance for said spring wire, a pivoted pin disposed between said other pair of converging end faces, means for moving said pivoted pin inwardly about its pivot to force said shoe members outwardly against said drum, outward movement of said shoes causing said other converging end faces to slide outwardly on said rigid pin.

5. A spindle comprising a bolster case, a blade rotatably supported centrally of the case, means on the blade having an inner brake surface, a pair of arcuate brake shoe elements provided with external circular braking surfaces and partially surrounding the blade, adjacent end faces of said shoe elements converging inwardly from said braking surfaces, guiding means for the shoe elements whereby said elements can move outwardly toward and inwardly away from said brake surface, a collar on said case adjacent said brake surface, a rigid pin supported by said collar and extending between and in sliding contact with one pair of said converging end faces, a movable pin loosely received in and pivoted near the base of an axial opening in said collar and extending between said other pair of converging end faces, a cam rotatably supported by said collar and operatively connected to said movable pin, manually operable means for causing said cam to move said movable pin about its pivot toward said blade to force its associated pair of converging end faces apart to move thereby said shoe members outwardly against said inner brake surface, said movement of said movable pin being accompanied by sliding action between said rigid pin and its associated converging end faces, whereby said shoe elements move outwardly substantially radially.

6. In a textile mill spindle, a bolster case, a spindle blade journalled therein and having a whorl, a continuous circular braking surface on the whorl, a brake shoe assembly comprising a pair of arcuate brake shoes having mutually adjacent, non-radial opposite end surfaces and having respective circular braking surfaces adjacent the braking surface of the whorl, fixed brake operating means on the bolster case arranged for brake applying camming engagement with two adjacent non-radial surfaces of the shoes, cooperating brake operating means arranged for brake applying camming engagement with the other two non-radial surfaces, and means on the bolster case guiding and supporting the cooperating brake operating means for movement radially of the shoes and whorl, whereby the movable brake operating means causes brake applying operation of the fixed brake operating means consequent upon initial operation sufficient to cause braking contact between portions of all the circular braking surfaces.

HERMAN H. BROOKSIEKER.
PAUL I. THYREEN.